(12) United States Patent
Olumofin (10) Patent No.: US 12,309,120 B2
(45) Date of Patent: *May 20, 2025

(54) DETECTING HOMOGRAPHS OF DOMAIN NAMES

(71) Applicant: Infoblox Inc., Santa Clara, CA (US)

(72) Inventor: Femi Olumofin, Cupertino, CA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,733

(22) Filed: Jan. 11, 2024

(65) Prior Publication Data

US 2024/0163256 A1 May 16, 2024

Related U.S. Application Data

(63) Continuation of application No. 17/827,150, filed on May 27, 2022, now Pat. No. 11,909,722, which is a continuation of application No. 16/248,357, filed on Jan. 15, 2019, now Pat. No. 11,388,142.

(51) Int. Cl.
| | |
|---|---|
| *H04L 9/40* | (2022.01) |
| *G06F 40/30* | (2020.01) |
| *G06N 3/04* | (2023.01) |
| *G06N 3/08* | (2023.01) |
| *H04L 61/4511* | (2022.01) |
| *H04L 101/30* | (2022.01) |
| *H04L 101/33* | (2022.01) |

(52) U.S. Cl.
CPC ......... *H04L 63/0263* (2013.01); *G06F 40/30* (2020.01); *G06N 3/04* (2013.01); *G06N 3/08* (2013.01); *H04L 61/4511* (2022.05); *H04L 63/0236* (2013.01); *H04L 2101/30* (2022.05); *H04L 2101/33* (2022.05)

(58) Field of Classification Search
None
See application file for complete search history.

(56) References Cited

U.S. PATENT DOCUMENTS

| | | |
|---|---|---|
| 8,050,500 B1 | 11/2011 | Batty |
| 9,762,612 B1 | 9/2017 | Schiffman |
| 9,882,933 B1 | 1/2018 | Schiffman |
| 10,423,403 B1* | 9/2019 | Natarajan ............ G06V 30/153 |
| 2012/0198549 A1* | 8/2012 | Antonakakis ....... H04L 61/4511 726/22 |
| 2017/0041333 A1* | 2/2017 | Mahjoub ............. H04L 43/0876 |

(Continued)

OTHER PUBLICATIONS

A. Costello, Network Working Group, Punycode: A Bootstring Encoding of Unicode for Internationalized Domain Names in Application (IDNA), Mar. 2003.

(Continued)

*Primary Examiner* — William J. Goodchild
(74) *Attorney, Agent, or Firm* — Van Pelt, Yi & James LLP (57) ABSTRACT

Various techniques for detecting homographs of domain names are disclosed. In some embodiments, a system, process, and/or computer program product for detecting homographs of domain names includes receiving a DNS data stream, wherein the DNS data stream includes a DNS query and a DNS response for resolution of the DNS query; applying a homograph detector for each domain in the DNS data stream; and detecting a homograph of a domain name in the DNS data stream using the homograph detector.

18 Claims, 6 Drawing Sheets

(56) References Cited

U.S. PATENT DOCUMENTS

| | | |
|---|---|---|
| 2017/0346853 A1 | 11/2017 | Wyatt |
| 2018/0027013 A1 | 1/2018 | Wright |
| 2018/0337947 A1* | 11/2018 | Schiffman ............... H04L 65/10 |
| 2019/0050559 A1* | 2/2019 | McCarty ............. H04L 63/1441 |
| 2019/0251401 A1* | 8/2019 | Shechtman ............ G06V 10/82 |

OTHER PUBLICATIONS

Author Unknown, Wandera, Punycod Attacks, The Fake Domains that are Impossible to Detect, Dec. 11, 2018.
Author Unknown, Wikipedia, Punycode, Dec. 11, 2018.
Author Unknown, WikiVisually, Kernal (image processing), Dec. 18, 2018.
Goodfellow et al., Deep Learning, pp. 1-372, 2016.
Liu et al., A Reexamination of Internationalized Domain Names: The Good, The Bad and the Ugly, 2018 48th Annual IEEE/IFIP International Conference on Dependable Systems and Networks, pp. 654-665.
Woodbridge et al., Detecting Homoglyph Attacks with a Siamese Neural Network, May 24, 2018.
Tian et al., "Needle in a Haystack: Tracking Down Elite Phishing Domains in the Wild", In Proceedings of the Internet Measurement Conference, Oct. 31-Nov. 2, 2018, 14 pages.

* cited by examiner

DETECTING HOMOGRAPHS OF DOMAIN NAMES

CROSS REFERENCE TO OTHER APPLICATIONS

This application is a continuation of U.S. patent application Ser. No. 17/827,150, entitled DETECTING HOMOGRAPHS OF DOMAIN NAMES filed May 27, 2022 which is a continuation of U.S. patent application Ser. No. 16/248,357, entitled DETECTING HOMOGRAPHS OF DOMAIN NAMES filed Jan. 15, 2019, now U.S. Pat. No. 11,388,142, which is incorporated herein by reference for all purposes.

BACKGROUND OF THE INVENTION

Network security is an increasingly challenging technical problem to protect networks and users accessing resources via networks, such as the Internet. The use of fake or misleading domain names is a frequently employed mechanism by malware, phishing attacks, online brand attacks, and/or for other nefarious activities that often attempt to trick users into visiting/accessing a site/service associated with the fake or misleading domain name.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Network security is an increasingly challenging technical problem to protect networks and users accessing resources via networks, such as the Internet. The use of fake or misleading domain names (e.g., spoofed domain names) is a frequently employed mechanism by malware, phishing attacks, online brand attacks, and/or for other nefarious and/or unauthorized activities that often attempt to trick users into visiting/accessing a site/service associated with the fake or misleading domain name (e.g., Uniform Resource Locators (URLs)).

Generally, an Internationalized Domain Name (IDN) uses at least one multi-byte Unicode character as a label. The internationalization of domain names enables most of the world's writing systems to form domain names using their native alphabets, which are available on scripts from the Unicode standard. For compatibility with DNS protocols and systems, IDN domains are encoded as ASCII using the Punycode system.

Specifically, Punycode refers to Unicode that can be used to convert words that cannot be written in ASCII for use as domain names. However, Punycode can also be misused to generate fake or misleading domain names (e.g., spoofed domain names) that attempt to impersonate target domain names using Punycode. For example, Punycode is often utilized by such malware, phishing attacks, online brand attacks, or other nefarious activities to generate fake or misleading domain names in order to deceive users into visiting/accessing a site/service associated with the fake or misleading domain name (e.g., URLs).

More specifically, the problem is that humans cannot easily commit Punycode domains (e.g., xn-aa-thringen-xhb.de) to memory, so most systems present these domains in decoded form (e.g., aa-thiiringen.de). As such, an IDN inadvertently creates a security problem for domain names, because it allows a vast set of different but, in many cases, visually similar characters for domain naming. As a result, bad actors can attempt to impersonate target domains (e.g., high-value target domain names) by substituting one or more of its ASCII characters with a visually similar but obscure Unicode character, such as shown in FIG. 1 as further described below.

Figure 1:
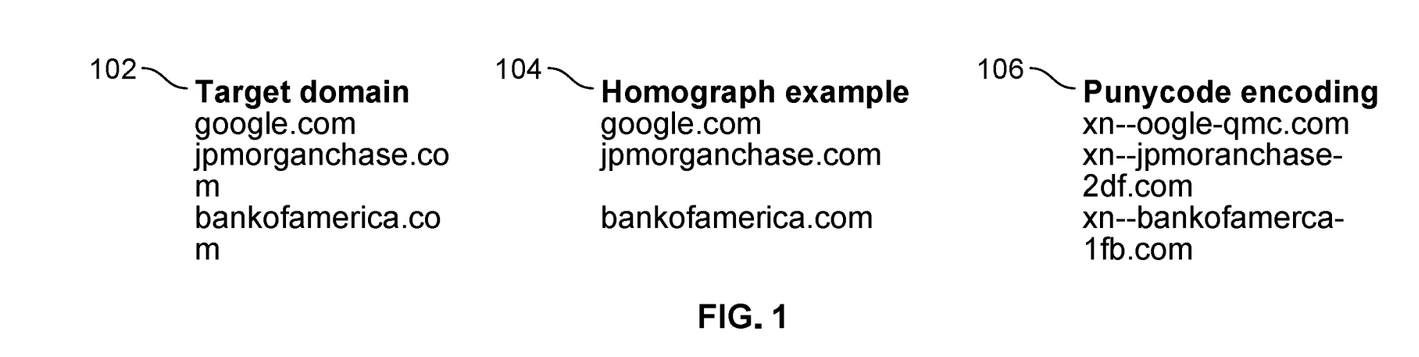
FIG. 1 provides examples of target domain names that can be spoofed using homograph examples and their associated Punycode encodings.

FIG. 1 provides examples of target domain names that can be spoofed using homograph examples and their associated Punycode encodings. As used herein, a homograph refers to a domain name created to impersonate another legitimate domain (e.g., a target domain name). Referring to FIG. 1, a target domain, such as google.com, as shown at 102, has a homograph example shown at 104, which has a Punycode encoding shown at 106. As is apparent in FIG. 1, the homograph example for the target domain of google.com appears to be identical, but has a different Punycode encoding. As such, this homograph can be potentially utilized by malware, phishing attacks, online brand attacks, and/or for other nefarious activities to deceive users into visiting/accessing a site/service associated with the homograph (e.g., a fake or misleading domain name for the target domain name of google.com in this example).

In order to mitigate the risk presented by fake or misleading domain names (e.g., potentially malicious domains), it is useful to be able to automatically detect such fake or misleading domain names (e.g., URLs), including homographs. However, static prevention approaches like existing, traditional domain blacklisting approaches and existing, traditional sinkholing approaches are typically not effective in countering fake or misleading domain names (e.g., URLs) that are generated using Punycode.

Thus, what are needed are new and improved techniques for providing domain name and Domain Name System (DNS) security. Specifically, what are needed are new and improved techniques for providing domain name and Domain Name System (DNS) security by detecting homographs of domain names.

Overview of Techniques for Detecting Homographs of Domain Names

Accordingly, various techniques for detecting homographs of domain names are disclosed. For example, the disclosed techniques for detecting homographs of domain names include providing a model (e.g., implemented using a classifier(s)) that is generated using deep learning techniques (e.g., deep neural networks or also referred to as deep networks).

In some embodiments, a system, a process, and/or a computer program product for detecting malicious domain names known as homographs is disclosed. For example, malicious actors often create homographs to impersonate high-value domain name targets and thereby deceive unsuspecting users, such as similarly described above with respect to FIG. 1. They typically use such fake/misleading domains to drop malware, phish user information, attack the reputation of a brand, and/or for other nefarious and/or unauthorized activities.

In some embodiments, a system, a process, and/or a computer program product for detecting homographs using deep learning techniques is disclosed. Some existing approaches focus on distance and string matching methods, such as using Levenshtein distance to attempt to identify the similarity between a target domain and a homograph domain. These approaches typically flag a positive detection when the distance between the two strings is determined to be close based on a threshold distance comparison. As an example some of these existing approaches attempt to use string matching for an IDN domain. However, such approaches will often result in false positives and missed matches, because the visual shape of characters used to create homographs was not considered. These approaches focused on the integer code points of Unicode characters instead of their shape or glyphs. The distinction is relevant in this technical security field, because homographs are designed to fool humans, and humans (e.g., users) generally judge domains based on their visual appearance and not on their code points.

Accordingly, in some embodiments, the disclosed techniques for detecting homographs of domain names exploit the shape and feature of the Unicode characters to train a deep learning system to identify characters with visual semblance to the digits, letters, and hyphen characters of a domain name. In an example implementation, a supervised machine learning system is a Convolutional Neural Network (CNN), which is state of the art for visual and image recognition tasks. In this example implementation, the identification of potential Unicode homographs is implemented using an offline process and can also be performed again whenever new scripts and characters are available with the Unicode standard (e.g., currently, new scripts and characters become available with the Unicode standard about once per year).

In some embodiments, a comprehensive and exhaustive map of the digits, letters, and hyphen characters of ASCII to Unicode characters that look alike is generated during a training phase and then efficiently and automatically applied during an online stage to detect homographs in real-time on live traffic during a DNS query and response data stream and/or later applied over DNS response log data. For example, the disclosed techniques can be implemented in a homograph detector for a DNS security solution, such as further described below. In an example implementation, the homograph detector for the DNS security solution is lightweight, because while the image generation and deep learning infrastructure is utilized for the offline/training stage, such infrastructure is not required for the online classification stage, which can be efficiently performed in real-time on live DNS traffic.

In other embodiments, the disclosed techniques can be similarly applied for detecting plagiarism evasion, phishing obfuscation, and/or executable filename impersonation by malware (e.g., the executable filename is not Word.exe but is actually malware.exe).

Another existing approach proposed by Woodbridge et al. (e.g., see Jonathan Woodbridge, Hyrum S. Anderson, Anjum Ahuja, Daniel Grant, EndGame Inc., Detecting Homoglyph Attacks with a Siamese Neural Network, 2018 IEEE Symposium on Security and Privacy Workshops. May 2018, which is available at https://arxiv.org/ab s/1805.09738) used a Siamese neural network with the input being the wide pixels of the domain. Such an approach requires an expensive infrastructure that would convert domains to images and complete online prediction of homographs from the images. In contrast, the disclosed techniques for detecting homographs of domain names perform homograph detection on a character by character basis, and then utilize that result at a latter online stage to identify homographs for a more efficient and a more accurate solution of homograph detection for domain names as further described below.

In some embodiments, a system, process, and/or computer program product for detecting homographs of domain names includes receiving a DNS data stream, wherein the DNS data stream (e.g., a live DNS data stream) includes a DNS query and a DNS response for resolution of the DNS query; applying a homograph detector for each domain in the DNS data stream; and detecting a homograph of a domain name in the DNS data stream using the homograph detector. For example, the disclosed homograph detector (e.g., homograph classifier) can automatically detect homographs for IDN domains and apply machine learning for Unicode character recognition.

In some embodiments, the homograph detector automatically detects homographs of one or more target domain names using a character-based map (e.g., an ASCII character to Unicode character(s) mapping).

In some embodiments, a system, process, and/or computer program product for detecting homographs of domain names further includes performing a mitigation action based on detecting the homograph of the domain name. For example, one or more of the following mitigation actions can be performed: generate a firewall rule based on an IP address associated with the homograph of the domain name; configure a network device to block network communications with an IP address associated with the homograph of the domain name; quarantine an infected host, wherein the infected host is determined to be infected based on an association with an IP address associated with the homograph of the domain name; and add the homograph of the domain name to a reputation feed.

In some embodiments, a system, process, and/or computer program product for detecting homographs of domain names includes generating training and test data sets for images of characters for domain names; training a homograph classifier using the training and test data sets to recognize Unicode characters that are visually similar to one or more ASCII characters; and executing the homograph classifier over a set of Unicode characters to generate an ASCII to Unicode map. For example, the disclosed homograph detector (e.g., homograph classifier) can automatically detect homographs for IDN domains and apply machine learning for Unicode character recognition.

For example, real-time homograph detection for domain names, unlike reactionary or offline detection, is performed in real time on a live stream of DNS queries in a DNS server/appliance (e.g., and can restrict input to the domain name string without other context information). As further described below, real DNS traffic data is used to train and evaluate a homograph detection model(s) (e.g., one or more classifier(s), which in some cases, can effectively and efficiently receive as input a domain name, and determine a probability of that domain name being a homograph, such as further described below).

In an example implementation, the homograph detection model(s) is targeted at real-time DNS queries for inline detection to facilitate real-time enforcement against homographs using the disclosed techniques. Furthermore, the disclosed techniques can capture malware IP addresses for blacklisting.

In another example implementation, the homograph detector is deployed for detecting homographs on a DNS response log stream.

In some embodiments, the disclosed techniques for detecting homographs of domain names are implemented using an offline stage and an online stage. In the offline stage, a training and testing data set is generated and used to train a Convolutional Neural Network (CNN) classifier. The CNN classifier is then used to create a mapping of relevant ASCII characters to visually similar Unicode characters. In the online stage, a detector utilizes the mapping and a list of target domain names to identify homographs on real, live DNS traffic. The disclosed techniques and example system implementations are further described below with respect to, for example, FIGS. 2 and 3.

These and other techniques for detecting homographs of domain names will now be further described below.

Online Platform Architecture for Detection of Homographs of Domain Names

Figure 2:
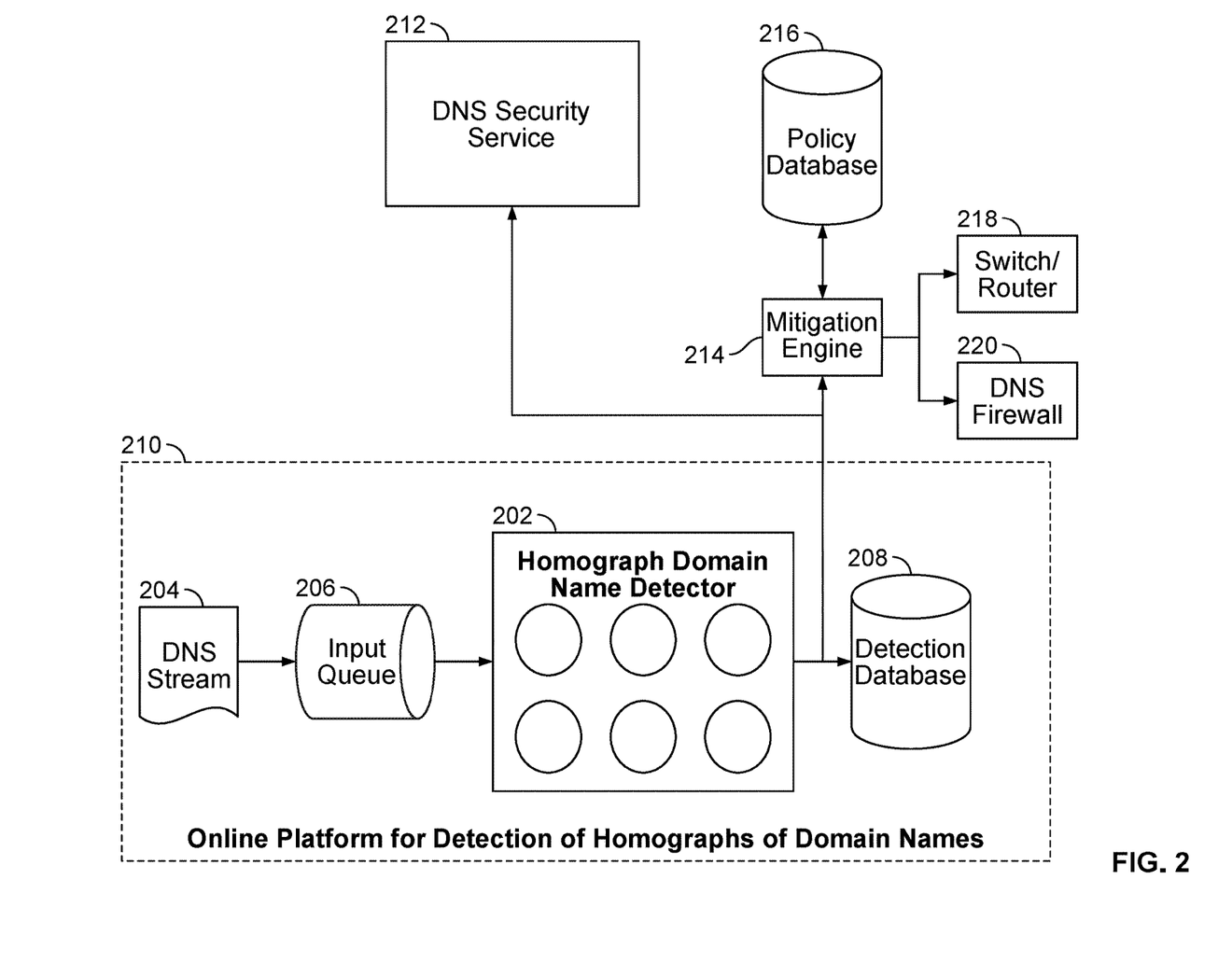
FIG. 2 is a functional block diagram illustrating an architecture for providing an online platform for detection of homographs of domain names in accordance with some embodiments.

FIG. 2 is a functional block diagram illustrating an architecture for providing an online platform for detection of homographs of domain names in accordance with some embodiments. FIG. 2 depicts how a classifier can be deployed for providing an inline homograph detection component as shown at 202 and further described below. In one embodiment, the framework for an online platform includes a real-time processor cluster (e.g., which can be a scalable implementation). For example, the real-time processor cluster can be configured to handle Complex Event Processing (CEP) functions that process and analyze DNS stream data input, conduct real-time DNS stream data detection including for performing detection of homographs of domain names. In an example implementation, the detection modules including homograph detection modules can be pluggable that are trained from an offline platform (e.g., an offline platform, such as further described below with respect to FIG. 3), such as described further with respect to FIG. 2. In particular, the online platform can apply one or more models (e.g., classifiers) for detection of homographs of domain names as further described herein. In addition, these models can be retrained and refined in the online system and/or offline system as further described herein.

Referring to FIG. 2, the online platform includes a homograph domain name detector 202 (e.g., implemented using a real-time processor cluster) that receives a DNS data stream 204 via an input queue 206. For example, to efficiently detect homographs of domain names in real-time, a horizontally scalable infrastructure that can facilitate real-time end-to-end processing can be provided. The homograph detection model/classifier, as further discussed below, can be implemented to perform at web scale and at DNS speed. In one example implementation of the architecture of the online platform shown in FIG. 2, the architecture is composed of various open source components that are distributed and horizontally scalable as further discussed below.

In an example implementation, an agent can be configured to execute on one or more DNS servers or appliances to collect and periodically or in real-time send DNS queries to DNS stream 204, which is then provided in a queuing mechanism to collect and near real-time process that DNS data using the homograph detection model/classifier (e.g., executed using the real-time process cluster) for implementing homograph domain name detector 202. For example, the agent can be configured to send over a DNS stream as structured data using input queue 206 as shown in FIG. 2. In some cases, the DNS data streams can be partitioned per grid, such as for security and/or for policy/rules separation (e.g., mitigations can be configured per grid based on a per grid policy or some other level of granularity). Input queue 206 can be implemented using an open source message queue, such as the Apache Kafka high-throughput distributed messaging system that can be used as a persistent queue for input of the DNS message stream.

In one embodiment, homograph domain name detector 202 performs automated detection of homographs of domain names in real time on a live DNS stream 204 using various techniques as described herein and provides DNS security detection results including homograph detection results to a detection database 208 (e.g., and in some implementations, a potential homograph detected using various techniques further described below can be stored in detection database 208 or cached in another data store/cache (not shown in FIG. 2) for further offline analysis, reporting, and/or sending to a cloud-based DNS security service 212 (via the Internet and/or other network communications) for further analysis, such as further described below). In an example implementation, homograph domain name detector 202 can be implemented using an open source platform for stream data processing, such as Apache Storm or Apache Spark, which is a free and open source distributed real-time computation system (e.g., a distributed framework that allows applications to run in parallel, in which users can build topology networks in the application layer based on its API, in which each topology that is distributed and managed by the Storm network is for one or more applications) that can be implemented to perform real-time analytics based on one or more homograph detection models/classifiers and various machine learning techniques as further described herein.

In an example implementation, this online detection framework can be implemented as an appliance (e.g., or using a set of appliances and/or computing servers or other types of computing devices, including virtual machine instances, such as a virtual appliance(s)). For example, the portion of the online platform as indicated by reference numeral 210 can be implemented as a component of a DNS server and/or a DNS appliance. As another example, the portion of the online platform as indicated by reference numeral 210 can be implemented on one or more computer servers or appliance devices or can be implemented as a cloud service, such as using Amazon Web Services (AWS) or another cloud service provider for cloud-based computing and storage services.

As also shown in FIG. 2, DNS security detection results determined using the online platform 210 can also be communicated to a mitigation engine 214. In some implementations, the mitigation engine can be implemented within or integrated with the online platform and/or as components of a DNS server and/or a DNS appliance. Mitigation engine 214 can determine and request various mitigation actions in response to the DNS security detection results based on a policy, such as a DNS security policy stored in a policy database 216. For example, mitigation engine 214 can configure a switch or router networking device 218 to filter (e.g., block or blacklist) a DNS query/request that was determined to be associated with a bad network domain (e.g., domain name/FQDN that was determined to be a homograph of a target domain name) using homograph domain name detector 202. In some implementations, mitigation actions in response to the DNS security detection results based on a policy, such as a DNS security policy stored in a policy database 216, can include send a DNS sample associated with a potential homograph of a target domain name to DNS security service 212.

As another example, mitigation engine 214 can communicate with a DNS firewall 220 to identify one or more determined bad domains that were determined to be associated with a bad network domain (e.g., domain name/FQDN that was determined to be a homograph of a target domain name) using homograph domain name detector 202. In some implementations, mitigation engine 214 communicates with a DNS firewall (e.g., or other firewall device) 220 using a data feed, such as a Response Policy Zone (RPZ) data feed, via a publish/subscribe connection protocol, and/or various other communication mechanisms. In one embodiment, an architecture for an online platform implementing a homograph domain name detector for network security is disclosed that supports multiple classifiers for performing DNS security. For example, common attributes can be efficiently extracted from a DNS data stream for using by two or more different classifiers for performing DNS security. Example classifiers include classifiers for homograph domain name detection, domain flux (fast flux) related activities, classifiers for DNS tunneling related activities, classifiers for domain generation algorithm (DGA) related activities, and/or other classifiers for performing DNS security. Example classifiers for homograph domain name detection will now be further described below.

In one embodiment, homograph domain name detector 202 includes a classifier for providing an inline homograph domain name detection component. For example, if a client device (not shown) sends a DNS query (e.g., A/AAAA query) to a DNS server, and if not cached, then the DNS server policy forwards the DNS query to an upper recursion (not shown) and also is provided in DNS stream 204 for security analysis performed using online platform for detection of homographs of domain names 210. The DNS query is processed for security analysis using homograph domain name detector 202 to determine if positive (i.e., this particular DNS query uses a domain name that is determined to be a homograph or determined to likely be a homograph based on a threshold, such as further described below with respect to FIG. 3), then the DNS query is identified as a homograph and sent to mitigation engine 214 to determine an action to be performed based on a rule/policy stored in policy database 216. As such, if the DNS query is resolved and detection is positive as determined using inline homograph domain name detector 202 (e.g., domains which resolve at the DNS server are checked against the classifier implemented by inline homograph domain name detector 202 to predict if they are malicious as similarly described above, in which the domain name can be predicted to be malicious/a homograph of a target domain name by the classifier implemented by inline homograph domain name detector 202 using the disclosed techniques for inline homograph domain name detection using deep networks, such as further described below with respect to FIG. 3), then an action can be performed based on a rule/policy stored in policy database 216 (e.g., adding the resolved IP address to a blacklist enforced using a firewall/DNS firewall, in which DNS firewall 220 can be implemented as a distinct product/service, such as a security server/appliance and/or security service, a component of the DNS server/appliance, and/or combinations thereof).

DNS data is very useful for detecting malicious activities in a network, including for detecting homographs of domain names. Accordingly, the disclosed techniques provide novel solutions for applying deep learning for real-time detection of homographs of domain names to facilitate inline detection of homographs of domain names (1) without the use of human engineered features, and (2) with the use of real traffic, rather than synthetic data, for training as further described below with respect to FIG. 3.

Creation of the Training Data Set

In some embodiments, real and live traffic DNS data can be used as samples to train a machine learning (ML) based model (e.g., classifier) that can automatically detect homographs of target domain names to facilitate inline homograph domain name detection with deep networks in accordance with some embodiments. In an example implementation, the homograph classifier is trained using a proprietary data set that includes a training image, training label, test image, and test label. In this example, the data set was generated using the ASCII characters for domain names (i.e., 0 . . . 9, a . . . z, A . . . Z, and -), Unicode seed confusable list (e.g., available at https://www.unicode.org/Public/security/12.0.0/confusables.txt), diacritic s (e.g., diacritical marks, accent), and multiple fonts uniformly scaled. The format of the data is an adaptation of the format used for the MINST dataset of handwriting digits (see, e.g., http://yann.lecun.com/exdb/mnist/). Unlike the MINST label files that use unsigned byte labels, each label for our data set is a 4-byte integer. The generation process renders each character as a 28×28 pixels image. In this example, the training set includes over a million images, and the test set has a few hundred thousand images and labels. Besides generating data for each of the character classes, an additional class can be included with a similar number of data points for other ASCII and Unicode characters that do not belong to the domain name characters or visually dissimilar Unicode characters.

Deep Learning Approach

In one embodiment, a neural network is trained using convolutional neural networks (CNNs). In another embodiment, other types of neural networks can be trained and utilized for performing the disclosed techniques for homograph domain name detection, such as using recurrent neural networks (RNNs). Both types of neural networks can take raw data as input, bypassing the need for manual feature extraction. In another embodiment, other machine learning algorithms such as K-Means Clustering and Support Vector Machines (SVMs) can be used to train the classifier.

Convolutional Neural Networks

CNNs are known for state-of-the-art advances in image processing, and apply to inputs of grid-like topology (see e.g., I. Goodfellow, Y. Bengio, and A. Courville, Deep learning, MIT Press, 2016, available at http://www.deeplearningbook.org). CNNs automatically learn filters to detect patterns that are important for prediction. The presence (or lack) of these patterns is then used by the quintessential neural network (e.g., multilayer perceptron, or MLP) to make predictions. These filters (e.g., also called kernels) are learned during backpropagation. An intuitive example in image processing is a filter which detects vertical edges, regardless of their location in the image.

The underlying operation of CNNs is element-wise multiplication, performed between each filter and sub-sections of the input. The resulting values indicate the degree to which these sub-sections match the filters. In this manner, the filters are convolved over the input to form an activation map, which represents the locations of discovered features. Each subsequent convolutional layer achieves further abstraction, finding higher level features comprised of those detected in preceding layers.

Image processing is a case of 2-Dimensional convolution. For the task of homograph domain name detection using images. As further described below with respect to FIG. 3, the networks that are trained in the deep learning approach can operate at the character level (e.g., character by character image-based analysis of each domain name for detection of homographs) and start with an embedding layer.

In an example implementation, these example neural nets can be trained using Python2 and Tensorflow. In this example implementation, the platform used for training is an AWS virtual machine with access to a GPU. The online model/classifier that can operate to classify Unicode characters as visually similar ASCII characters of domain name labels. The mapping of the classification result can be used to detect homographs inline on a DNS data stream (e.g., live DNS traffic). The disclosed detection system can be implemented using Java, Scala, or another high-level programming language.

Moreover, the disclosed techniques can include online continuous training (e.g., including automatic feature extraction). For example, the disclosed techniques can be applied to periodically train and refine the classifier(s) after online deployment without human interaction (e.g., based on periodic updates to the Unicode standard as further described below).

Figure 3:
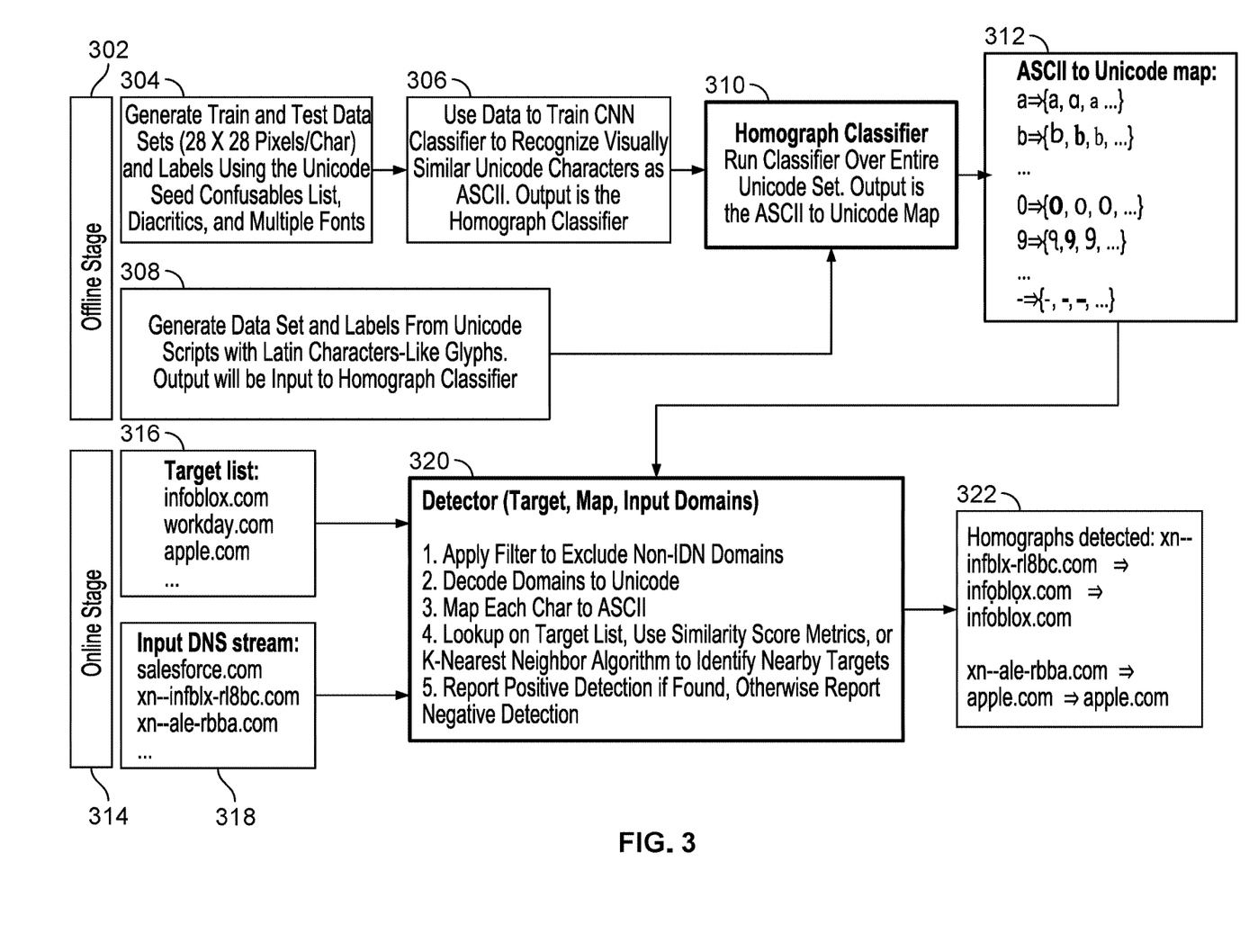
FIG. 3 illustrates a convolutional neural network (CNN) architecture for homograph classifier training in accordance with some embodiments.

Embodiments of a Machine Learning Architecture for Offline Training of a Homograph Classifier and an Online Detection of Homographs of Domain Names Using the Homograph Classifier FIG. 3 illustrates a convolutional neural network (CNN) architecture for homograph classifier training in accordance with some embodiments. Specifically, FIG. 3 provides an example CNN architecture used to train a homograph classifier 310 during an offline stage 302 and then deploying the homograph classifier in an online stage 314 for automatically detecting homographs of domain names on a DNS data stream (e.g., live DNS traffic) that is further described below. For example, the homograph classifier can be deployed for implementing homograph domain name detector 202 as similarly described above with respect to FIG. 2. As further described below with respect to FIG. 3, the disclosed techniques include training and deploying a CNN architecture that detects homographs of domain names using a character by character image-based analysis of domain names.

Referring to offline stage 302, the offline process begins at 304 with generating training and test data sets (e.g., 28 by 28 pixels per character image or using another pixel density) (e.g., an example test data set can include a MNIST data set) and labels using a Unicode seed confusable list (e.g., available at https://www.unicode.org/Public/security/12.0.0/confusables.txt), diacritics (e.g., glyphs added to letters, such as a diacritical mark, a diacritical point, a diacritical sign, or an accent), and multiple fonts. The test data sets are then used to train a CNN classifier to recognize visually similar Unicode characters as ASCII and then output the homograph classifier as shown at 306. At 308, a data set and labels from Unicode scripts with Latin character-like glyphs are generated and provided as an input to the homograph classifier as shown in FIG. 3. At 310, the homograph classifier is executed over the entire Unicode set to map an ASCII character to each Unicode character in the Unicode set based on visual similarity. The resulting output is a mapping of ASCII to Unicode (e.g., an ASCII to Unicode map) as shown at 312. Accordingly, as shown at 312, each ASCII character can be mapped to various different Unicode characters using the disclosed image-based character by character mappings.

Referring to online stage 314, a target list of domain names 316 (e.g., infoblox.com, workday.com, apple.com, etc.) is provided as an input to a homograph detector 320. An input DNS stream (e.g., a DNS data stream) 318 is then provided to homograph detector 320. Target list of domain names 316 can be a configurable list of domain names for a given entity/customer, for a given vertical (e.g., government entities, bank/financial entities, medical/hospital entities, retail entities, technology entities, or other vertical markets/channels), for entities in a given geographical area, a list of the most popular domains (e.g., commercially available/open source publicly available lists of domain names, such as the list provided by Majestic Million available at https://majestic.com/reports/majestic-million or DomCop available at https://www.domcop.com/, or other available top/popular domain listings), and/or any combination thereof. In this example implementation, homograph detector 320 includes target list of domain names 316, ASCII to Unicode map 312, and input domains/DNS stream 318. During operation on the input domains/DNS stream 318, homograph detector 320 first applies a filter to exclude non-IDN domains (e.g., an optional stage of operation to reduce computing operations and resources that would otherwise be utilized for processing on such non-IDN domains). Homograph detector 320 then decodes each of the domains received in the input domains/DNS stream 318 to Unicode. Homograph detector 320 applies the map (e.g., ASCII to Unicode map 312) to map each of the Unicode characters to an ASCII character. At a next stage of operation, homograph detector 320 performs a lookup on the target list, applies similarity score metrics, and/or implements a k-nearest neighbors (k-NN)

algorithm or other distance/classification/ML algorithm to identify matches based on the lookup and/or nearby/close matches based on the threshold similarity scores or k-NN threshold distance results in this example implementation. Homograph detector 320 then reports a positive detection if found (e.g., input domain name is a homograph, also referred to herein as a homograph domain), and otherwise reports a negative detection (e.g., input domain name is not a homograph). Finally, detected homographs from the processed input domains/DNS stream 318 are output as shown at 322 (e.g., which can be added to a blacklist for implementation/enforcement by a firewall/DNS firewall and/or added to a homograph domain blacklist feed). In this example, homographs of infoblox.com and homographs of apple.com are reported based on the techniques performed using the homograph detector during the online stage of operation.

The offline training of the CNN classifier will now be further described below with respect to FIG. 4.

Figure 4:
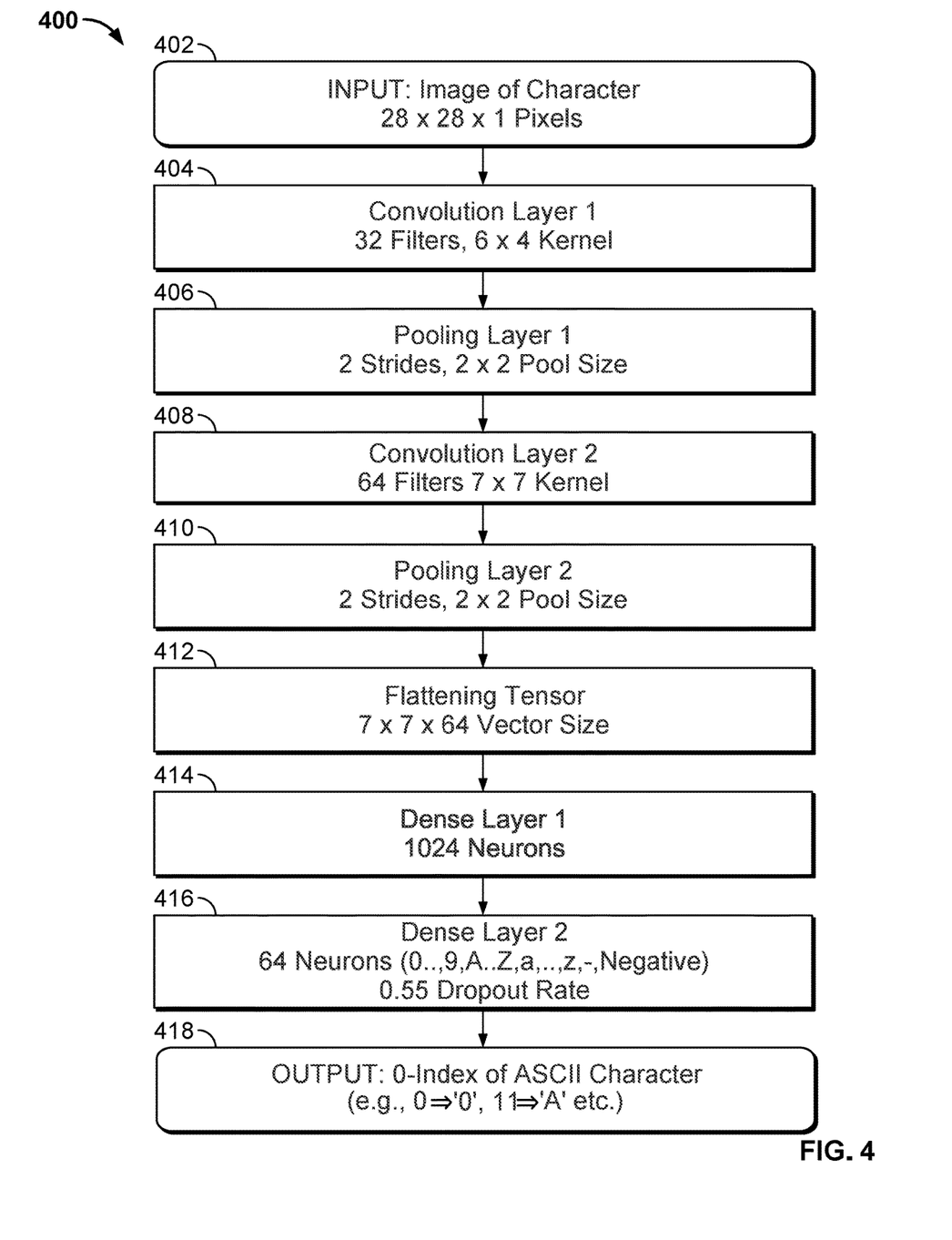
FIG. 4 is a process for performing a convolution kernel training on an input image of a character to generate a mapping to an ASCII character in accordance with some embodiments.

FIG. 4 is a process for performing a convolution kernel training on an input image of a character to generate a mapping to an ASCII character in accordance with some embodiments. In an example implementation, the training process will attempt to utilize many different numbers of convolution kernels to create features that would later be used for classification. The process 400 for performing the offline training for the CNN classifier will now be further described below.

At 402, the input includes providing each input image for each character (e.g., using 28×28 pixels with a single-color channel (grayscale) or using another pixel density and/or another color channel). During training, a batch of input images (e.g., 100 or another number of input images) can be processed at the same time to reduce computing time for processing the entire set of character images.

At 404, convolution layer 1 computes 32 features through a linear combination of the pixels in each input image using a neighborhood defined by a kernel that is 6×4 pixels in dimension.

At 406, pooling layer 1 integrates the value of neighboring pixels from convolution layer 1 using maximum pooling to reduce the dimension of extracted features. In this example, the pool size is 2×2, and the stride is 2.

At 408, convolution layer 2 computes 64 features using a linear combination of the output of the pooling layer 1 in the neighborhood defined by a 7×7 kernel.

At 410, pooling layer 2 integrates the value of neighboring pixels from the second convolution layer using max pooling with a 2×2 pool size and a stride of 2.

At 412, flattening tensor generates a 7×7×64 vector of features for each character in this example implementation.

At 414, dense layer 1 provides the first of two layers that use the features from convolutional layer 2 to classify input images into labels using a flattened feature vector from pooling layer 2. In this example, it includes 1024 neurons.

At 416, dense layer 2 includes 64 neurons for final image classification into the input classes (e.g., 0 . . . 9, A . . . Z, a . . . z, –, and the negative class). In this example implementation, dense layer 2 includes a drop-out regularization at a rate of 0.55 to help improve model accuracy.

At 418, the output of dense layer 2 is input into a softmax function or another similar function, which converts the vector of weights representing the classification of an input image into a vector of numbers between 0 and 1 that are the probabilities for each of the possible classes in the input. As such, the classification result for a particular input image is the position of the probability value that is the largest.

Generally, the artificial intelligence (AI) deep learning approach of CNN was created to operate like the visual cortex part of the human brain. In an example implementation, the CNN architecture can be implemented to automatically learn feature during the training process by exploiting the spatial structure of an input image (e.g., the input image of each character of a domain name) using mathematical convolution.

Additional example processes for the disclosed techniques for detecting homographs of domain names will now be described.

Example Processes for Detecting Homographs of Domain Names

Figure 5:
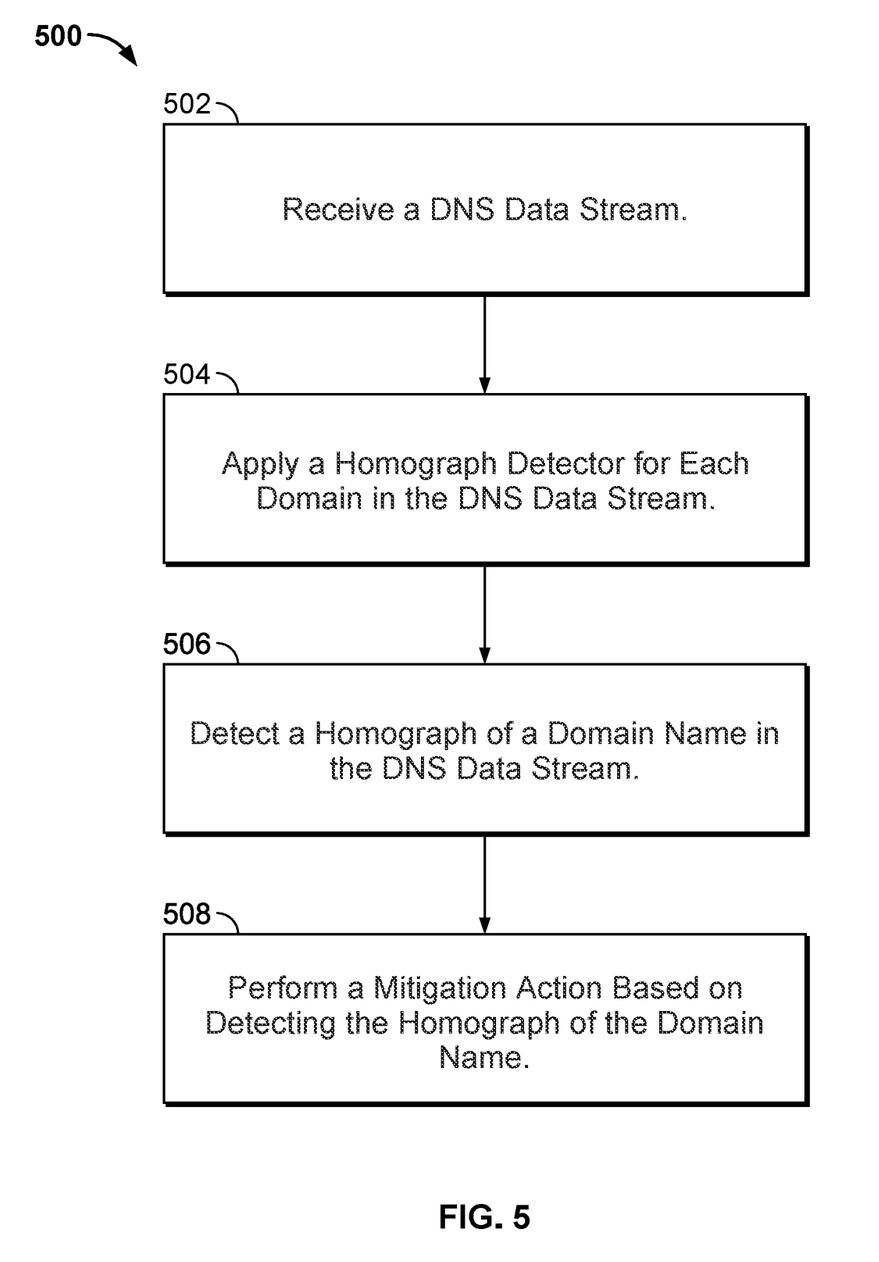
FIG. 5 is a flow diagram illustrating an online process for detecting homographs of domain names in accordance with some embodiments.

FIG. 5 is a flow diagram illustrating an online process for detecting homographs of domain names in accordance with some embodiments. In various embodiments, process 500 is performed by the systems and processes described above with respect to FIGS. 2-4.

At 502, a DNS data stream is received. For example, the DNS data stream can include a DNS query and a DNS response for resolution of the DNS query.

At 504, applying a homograph detector for each domain in the DNS data stream is performed. For example, various techniques are disclosed for generating a homograph detection model, which identifies homographs using image-based character by character similarity techniques to detect homographs of target domain names as similarly described above.

At 506, detecting a homograph of a domain name in the DNS data stream using the homograph detector is performed. For example, the homograph classifier can perform a lookup on the target list, apply similarity score metrics, and/or implement a k-nearest neighbors (k-NN) algorithm or other distance/classification/ML algorithm to identify matches based on the lookup and/or nearby/close matches based on the threshold similarity scores or k-NN threshold distance results as similarly described above.

At 508, a mitigation action is performed based on detecting the homograph of the domain name. For example, the mitigation action can include a configuration action and/or a filtering action (e.g., block or drop packets to/from the bad/malware network domain and/or bad/malware IP address associated with the potentially malicious network domain). As another example, the mitigation action can include configuring a network device (e.g., a switch or router, implemented as a physical or virtual switch/router) to quarantine the infected host and/or block access to the bad network domain and/or bad IP address associated with the homograph of the domain name, using network access control or other mechanisms to quarantine the infected host and/or block access to the bad network domain and/or bad IP address, configuring a security device controller using Open Flow techniques to configure a network device (e.g., a switch or router, implemented as a physical or virtual switch/router) to quarantine the infected host and/or block access to the bad network domain and/or bad IP address, and/or to implement other configuration/programming techniques such as via API or publish/subscribe mechanisms to configure a network device (e.g., a switch or router, implemented as a physical or virtual switch/router) to quarantine the infected host and/or block access to the bad network domain and/or bad IP address.

Figure 6:
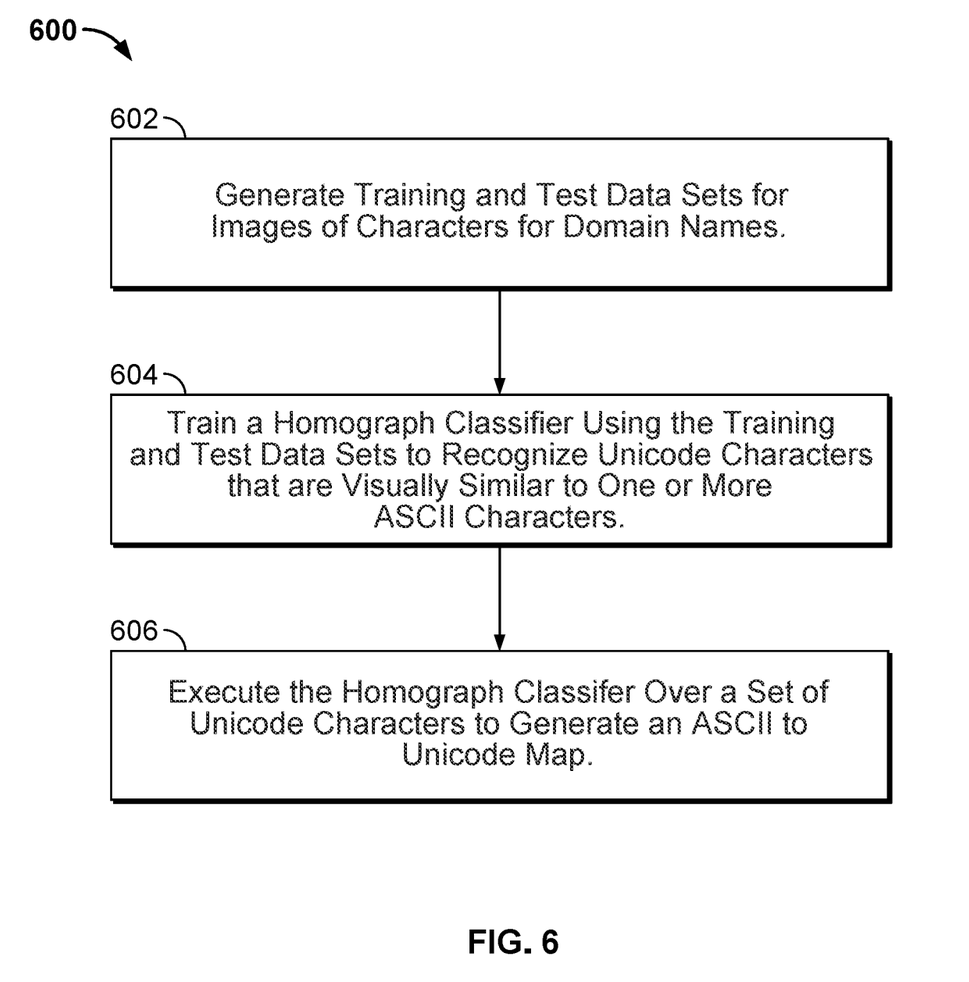
FIG. 6 is a flow diagram illustrating an offline process for generating a model for detecting homographs of domain names in accordance with some embodiments.

FIG. 6 is a flow diagram illustrating an offline process for generating a model for detecting homographs of domain names in accordance with some embodiments. In various embodiments, process 600 is performed by the systems and processes described above with respect to FIGS. 2-4.

At 602, generating training and test data sets for images of characters for domain names is performed. For example, the training and test data sets for images of characters for domain names can be implemented as similarly described above with respect to 304 of FIG. 3.

At 604, training a homograph classifier using the training and test data sets to recognize Unicode characters that are visually similar to one or more ASCII characters is performed. For example the homograph classifier can be trained as similarly described above with respect to 306 of FIG. 3.

At 606, executing the homograph classifier over a set of Unicode characters to generate an ASCII to Unicode map is performed. For example the homograph classifier can generate an ASCII to Unicode map as similarly described above with respect to 310 and 312 of FIG. 3. In an example implementation, the homograph classifier can be deployed to provide an inline homograph detection model (e.g., classifier) as similarly described above with respect to FIG. 6. Moreover, the homograph detection model can continue online learning on live DNS traffic (e.g., including automatic feature extraction) using the disclosed techniques as similarly described above. For example, if new scripts and characters are added to the Unicode standard, then the offline training process described above can be performed to update the homograph classifier to generate an ASCII to Unicode character mapping that includes the new Unicode characters (e.g., currently, new scripts and characters become available with the Unicode standard about once per year).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a DNS data stream, wherein the DNS data stream includes a DNS query and a DNS response for resolution of the DNS query;
      apply a homograph detector for each domain in the DNS data stream; and
      detect a homograph of a domain name in the DNS data stream using the homograph detector, wherein the homograph detector is generated using a deep neural network technique and training data, and wherein the deep neural network technique includes a recurrent neural network (RNN) technique, a K-Means clustering technique, a support vector machine (SVM) technique or any combination thereof; and
   a memory coupled to the processor and configured to provide the processor with instructions.

2. The system recited in claim 1, wherein the DNS data stream is a live DNS data stream.

3. The system recited in claim 1, wherein the homograph detector automatically detects homographs of one or more target domain names.

4. The system recited in claim 1, wherein the homograph detector automatically detects homographs of one or more target domain names using a character-based map.

5. The system recited in claim 1, wherein the processor is further configured to:
   perform a mitigation action based on detecting the homograph of the domain name.

6. The system recited in claim 1, wherein the processor is further configured to:
   block the DNS response to impede a client communication with an IP address associated with the homograph of the domain name.

7. The system recited in claim 1, wherein the DNS response for resolution of the DNS query includes an IP address, and wherein the processor is further configured to:
   add the IP address associated with the homograph of the domain name to a blacklist or add homograph domain to a blacklist feed.

8. The system recited in claim 1, wherein the DNS response for resolution of the DNS query includes an IP address, and wherein the processor is further configured to:
   send the IP address associated with the homograph of the domain name to a firewall.

9. The system recited in claim 1, wherein the processor is further configured to perform one or more mitigation actions comprising to:
   generate a firewall rule based on an IP address associated with the homograph of the domain name;
   configure a network device to block network communications with the IP address associated with the homograph of the domain name;
   quarantine an infected host, wherein the infected host is determined to be infected based on an association with the IP address associated with the homograph of the domain name; and
   add the homograph of the domain name to a reputation feed.

10. A method, comprising:
    receiving a DNS data stream, wherein the DNS data stream includes a DNS query and a DNS response for resolution of the DNS query;
    applying a homograph detector for each domain in the DNS data stream, wherein the homograph detector is generated using a deep neural network technique and training data, and wherein the deep neural network technique includes a recurrent neural network (RNN) technique, a K-Means clustering technique, a support vector machine (SVM) technique or any combination thereof; and
    detecting a homograph of a domain name in the DNS data stream using the homograph detector.

11. The method of claim 10, wherein the DNS data stream is a live DNS data stream.

12. The method of claim 10, wherein the homograph detector automatically detects homographs of one or more target domain names.

13. The method of claim 10, wherein the homograph detector automatically detects homographs of one or more target domain names using a character-based map.

14. The method of claim 10, further comprising:
    performing a mitigation action based on detecting the homograph of the domain name.

15. A computer program product, the computer program product being embodied in a tangible computer readable storage medium and comprising computer instructions for:
    receiving a DNS data stream, wherein the DNS data stream includes a DNS query and a DNS response for resolution of the DNS query;
    applying a homograph detector for each domain in the DNS data stream, wherein the homograph detector is generated using a deep neural network technique and training data, and wherein the deep neural network technique includes a recurrent neural network (RNN)

technique, a K-Means clustering technique, a support vector machine (SVM) technique or any combination thereof, and detecting a homograph of a domain name in the DNS data stream using the homograph detector.

16. The computer program product recited in claim 15, wherein the DNS data stream is a live DNS data stream.

17. The computer program product recited in claim 15, wherein the homograph detector automatically detects homographs of one or more target domain names.

18. The computer program product recited in claim 15, wherein the homograph detector automatically detects homographs of one or more target domain names using a character-based map.

* * * * *